United States Patent [19]

Murayama

[11] Patent Number: 4,636,878
[45] Date of Patent: Jan. 13, 1987

[54] COMBINED DETECTOR CIRCUIT FOR DETECTING A TAPE END OR UNRECORDED AREA OF A TAPE

[75] Inventor: Kazuo Murayama, Kanagawa, Japan

[73] Assignee: Sony Corporation, Tokyo, Japan

[21] Appl. No.: 711,753

[22] Filed: Mar. 14, 1985

[30] Foreign Application Priority Data

Mar. 15, 1984 [JP] Japan .................................. 59-48195

[51] Int. Cl.⁴ ........................ G11B 15/18; G11B 27/22
[52] U.S. Cl. ..................................... 360/71; 360/72.1; 360/73; 360/74.6
[58] Field of Search ....................... 360/71, 72.1, 72.2, 360/74.1, 74.5, 74.6, 74.7, 74.4, 69, 73; 242/57, 186, 188, 195

[56] References Cited

U.S. PATENT DOCUMENTS

| | | | |
|---|---|---|---|
| 3,846,831 | 11/1974 | Johnson, Jr. et al. | 360/74.4 |
| 3,893,177 | 7/1975 | Takenaka | 360/72.1 |
| 4,138,698 | 2/1979 | Kokei | 360/74.6 |
| 4,404,604 | 9/1983 | Ueki et al. | 360/71 |
| 4,413,290 | 11/1983 | Furuta | 360/74.1 |

FOREIGN PATENT DOCUMENTS

| | | | |
|---|---|---|---|
| 56-117352 | 9/1981 | Japan | 360/71 |
| 2004112 | 3/1979 | United Kingdom | 360/72.1 |

OTHER PUBLICATIONS

Radio Electronics "New for Cassettes Automatic Program Search" Savon, Mar. 1977, pp. 52-53.

Primary Examiner—Raymond F. Cardillo
Assistant Examiner—Steven R. Garland
Attorney, Agent, or Firm—Hill, Van Santen, Steadman & Simpson

[57] ABSTRACT

An automatic fast action automatic reversing tape recording system comprising a first detecting circuit for generating a first output signal which changes from one state to another state only when the end of the record coated portion of the tape is detected by the sensor in the forward mode of the apparatus, a second detecting circuit for generating a second output signal which changes from one state to another state only when a non-recorded area of the tape is detected in the fast-forward or fast-rewind mode of the apparatus, a third detecting circuit to which both of said first and second output signals are supplied for generating a switching signal to change the mode of the apparatus when either of said output signals is maintained in said another state for predetermined times measured by the same time constant circuit. The third detecting circuit may include an integration circuit which is charged to different DC voltages by said first or second output signals which are in their one state in response to the mode of the apparatus and are then discharged along a time constant from a time when each of said first or second output signals changes to its said other state.

1 Claim, 14 Drawing Figures

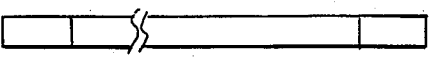
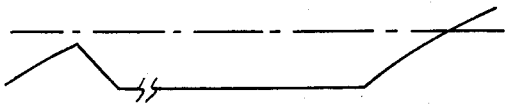
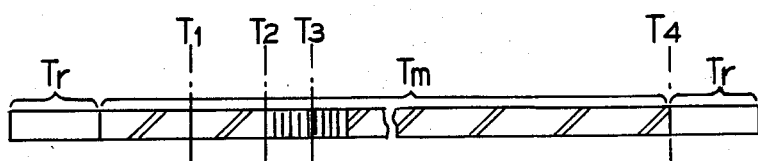
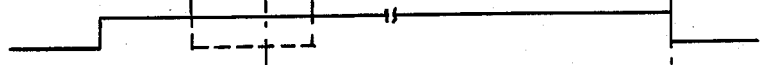
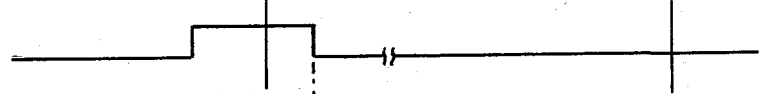
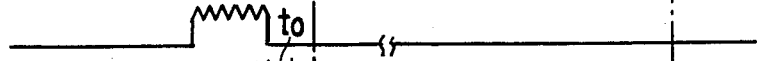
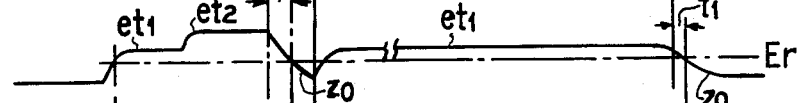
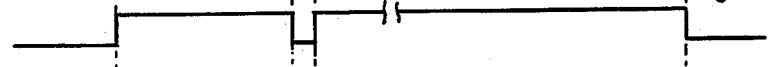
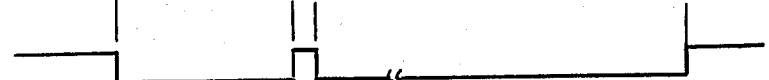
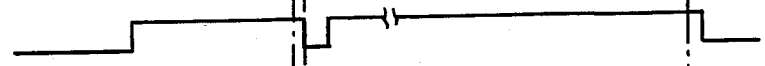
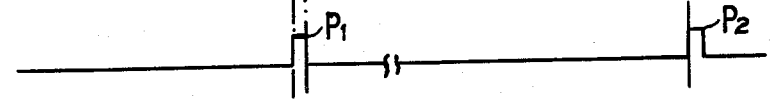

COMBINED DETECTOR CIRCUIT FOR DETECTING A TAPE END OR UNRECORDED AREA OF A TAPE

FIELD OF THE INVENTION

This invention relates to a tape recording and/or reproducing apparatus of automatic reversing type which will automatically change the direction in which the magnetic tape is running, and is, more particularly, directed to a detecting circuit for quickly detecting the end of the magnetic coating portion of the magnetic tape.

BACKGROUND OF THE INVENTION

There are many methods developed for detecting the end of the magnetic tape when the tape in the cassette is fully wound onto the take-up reel of the apparatus. One of them has an optical device arranged close to the tape path for detecting the difference of optical character between the portion where magnetic particles are coated and the leader portions which are attached at both ends of the coating portion. For detecting the actual tape end, such devices have to distinguish whether the detected leader portion is attached at the beginning of the coating portion or at the end. Usually, an electronic device is coupled with the optical device for that purpose, which includes, for example, an integration circuit having a certain time constant which provides enough time for the leader portion attached at the beginning of the coating portion to pass through the optical device for preventing misoperation.

Of course, the above mentioned device can be used for an apparatus of automatic reversing type which will automatically change the direction at the tape end, but it is desired for such an apparatus that the change of direction shall occur as soon as possible following the end of the coating portion.

Various electronic circuits, for example, a combination of a differential or integration circuit and a logic circuit, are developed to resolve the problem. However, each of these circuits, added only for detecting the end of the coating portion is complicated and expensive, and would be reflected in an undesirable increase in the price of the apparatus.

OBJECT OF THE INVENTION

It is an object of the invention to provide a tape recording and/or reproducing apparatus of automatic reversing type which will change the direction of the tape as quickly as possible after detecting the end of the coating portion of the tape.

It is another object of the invention to provide the detecting circuit in such an apparatus which is simple and inexpensive.

It is a further object of the invention to provide a detecting circuit having a common part with another circuit in the recording and/or reproducing apparatus.

According to this invention, there will be provided a tape recording and/or reproducing apparatus of automatic reversing type which comprises a first detecting circuit for generating an output signal which changes from one state to another state only when the end of the coating portion of tape is detected by the sensor, a second detecting circuit for generating an output signal which changes from one state to another state only when a non-recorded area of the tape is detected, and a third detecting circuit to which both of the output signals of the first and second detecting circuits are directed for generating a switching signal to change the mode of the apparatus when either of the output signals is maintained in the said another state for a predetermined time measured by the same time constant circuit.

As will be seen, the third detecting circuit includes an integration circuit which has a certain time constant so as to distinguish the pianissimo part of the sound signal from the non-recorded area of the tape in the fast-forward or fast-rewind mode of the apparatus, and also distinguish a damaged portion of the tape, for example, a portion where the magnetic particles have partially dropped off, from the end of the coating portion as the tape is running in the forward mode. Furthermore, the time constant can be made small because the output signal of the second detecting circuit is generated only when the end (and not the beginning) of the coating portion of the tape is detected, to quickly change the direction of the tape when the coating portion is terminated.

These and other objects of the invention and advantages of the invention will be more fully understood from the following description and drawings.

BRIEF DESCRIPTION OF THE DRAWINGS

FIG. 2A illustrates tape and FIGS. 2B and 2C illustrate waveforms which are generated at two sections in the circuit shown in FIG. 1;

FIG. 4 illustrates the tape and FIGS. 4a–4h illustrate waveforms which are generated at several sections in the circuit shown in FIG. 3.

DETAILED DESCRIPTION OF THE PREFERRED EMBODIMENT

Figure 1:
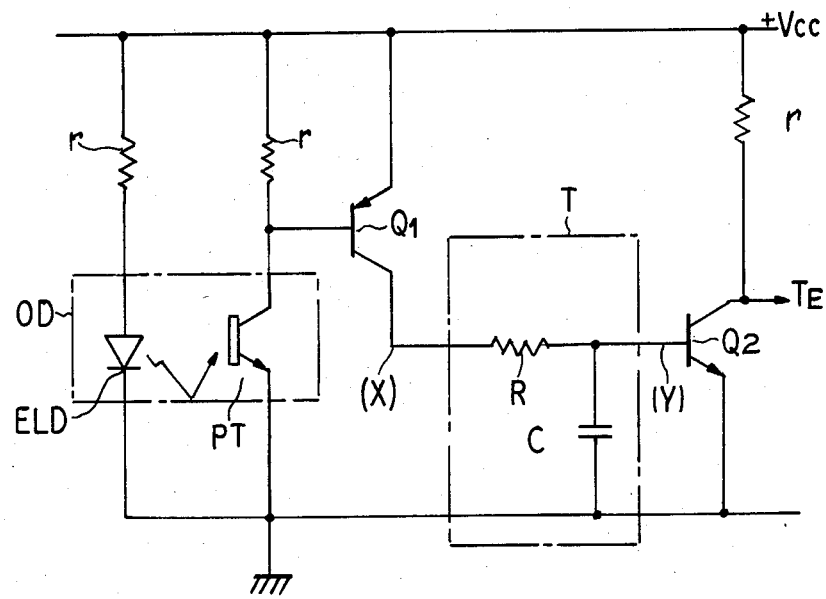
FIG. 1 is a tape end detecting circuit as a typical example described in the prior art.

As is well known, a magnetic tape contained in a conventional cassette has a magnetic coating portion and leader portions which are typically transparent and attached at both ends of the coating portion for a length of about two inches. One of the methods for detecting the end of the tape is to use an optical device which is arranged close to the tape path and can detect the difference in optical characteristics between the coated portion and the leader portion. FIG. 1 shows a detecting circit as a typical example by which the theory for detecting the tape end will be clearly understood.

Referring now to FIG. 1, an optical device OD comprises, for example, an electric luminescent diode ELD and a phototransister PT which are closely arranged at both sides of the tape path. The detecting circuit consists of optical device OD, switching transistors $Q_1$ and $Q_2$ and an integration circuit T.

As clearly shown in FIG. 1 and FIG. 2 DC voltage (Vcc) is supplied to integration circuit T when either of the leader portions is detected by the optical device OD. To detect the end of the tape, the time constant which is determined by resistor R and condenser C of the integration circuit should be made large enough to make the switching transistor $Q_2$ turn on only when the tape is fully wound.

On the other hand, it is desired for tape recording and/or reproducing apparatus of the automatic reversing type that the change of direction shall occur as quickly as possible at the end of the coated portion. Therefore, various electronic circuits, for example, a combination of a differential or an integration circuit and a logic circuit, have been developed to detect the end of the coating portion of the tape.

It is noted that in recently developed tape recording and/or reproducing apparatus, there is a mode of operation in which a non-recorded area of the tape located between the recorded portions, can be detected in fast-forward or fast-rewind mode of the apparatus for quickly searching for the beginning of the particular song or music segment to which the operator wants to listen. In this mode of apparatus, called AMS (Automatic Music Sensor) mode, the magnetic head reproduces the recorded signals from the tape which is running at high-speed and a rectifying circuit, to which the reproducing signals are supplied, and logic circuits are combined to detect the non-recorded area of the tape.

It is one of the objects of this invention to combine the detecting circuit for detecting the end of the coated portion of the tape to such a circuit for detecting the non-recorded area of the tape. As will be seen, the detecting operation of the tape end is performed in the forward mode of the apparatus and the detecting operation of the non-recorded area is performed in the fast-forward or fast-rewind mode of the apparatus. Accordingly, no interference problem occurs, even though the two circuits have a common part.

FIG. 2A illustrates a tape with leaders at the beginning and end and a coated portion in the middle. FIG. 2B shows a detected signal obtained by a leader detector and FIG. 2C illustrates signal of 2B which has been integrated.

Figure 3:
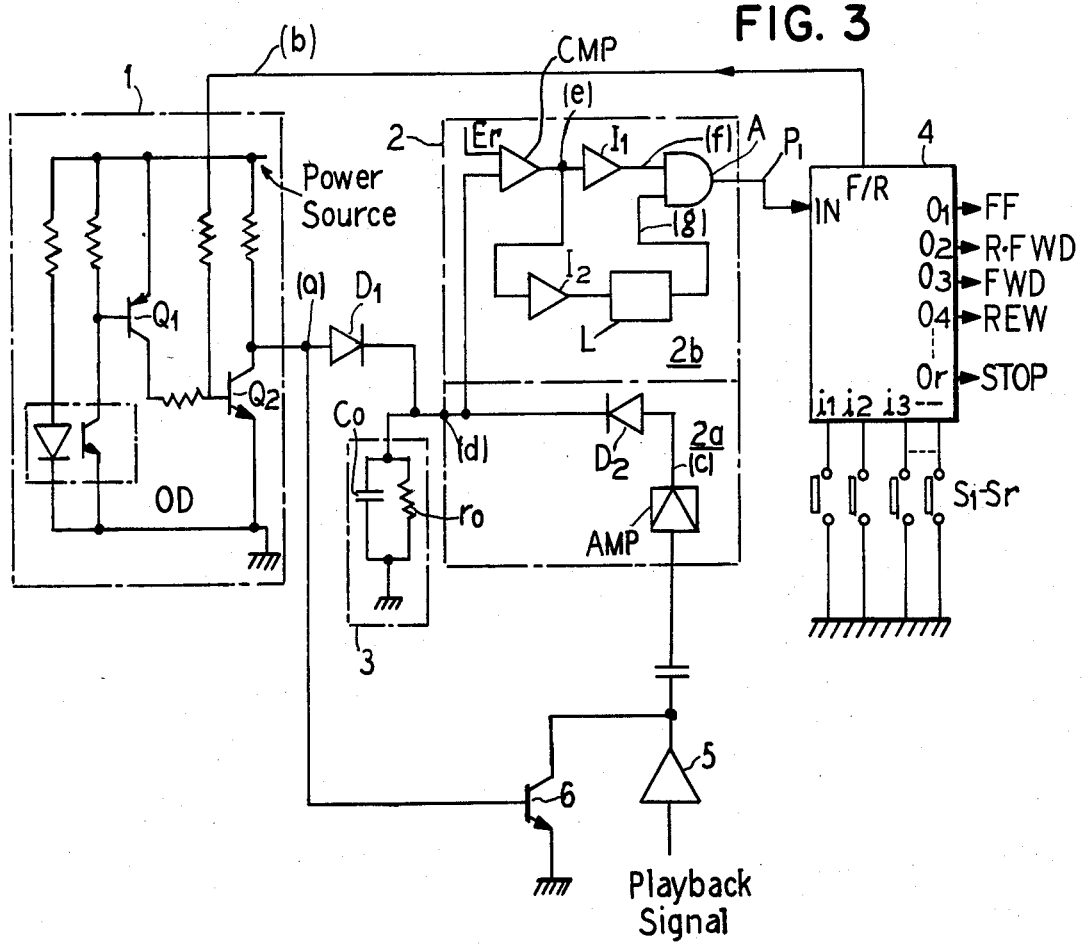
FIG. 3 is a combined circuit of a tape recording and/or reproducing apparatus of automatic reversing type as an embodiment of this invention.

Referring now to FIG. 3, one embodiment of the invention comprises a detecting circuit 1 for detecting the end of the coated portion of the tape, an integration circuit 2 for detecting the non-recorded area of the tape, having a rectifying circuit 2a and a logic circuit 2b, an integration circuit 3 having a certain time constant determined by resistor $r_o$ and a condensor $C_o$, a control circuit 4 for generating several control signals corresponding to several modes of the apparatus, and a playback amp 5 which output will be controlled by a muting transistor 6.

The detecting circuit 1 comprises the optical device OD which will work as the conventional type shown in FIG. 1 and two switching transistors $Q_1$ and $Q_2$ so that when the mode of the apparatus is in the fast-forward or fast-rewind modes the transistor $Q_2$ will be turned on by the signal coming from this loop to keep the output in "L" level.

The logic circuit 2b consists of a comparator CMP, invertors $I_1$ and $I_2$, a delay circuit L and an AND circuit A. One of the input terminals of the comparator CMP is connected to the output of the detecting circuit 1 and the rectifying circuit 2a, and it is also connected to the integration circuit 3.

This integration circuit 3 will generate a signal having a certain voltage corresponding to the current coming from either of the detecting circuit 1 or the rectifying circuit 2a.

The control circuit 4 has input terminals $I_1, I_2, \ldots I_r$ and output terminals $O_1, O_2 \ldots O_r$. When one of the operation switches $S_1$-$S_r$ is depressed, one of the output terminals $O_1, O_r$ will generate a control signal corresponding to the selected mode of the apparatus for controlling the tape-drive mechanism. When the switching signal is supplied to the input terminal IN of the control circuit 4, the control circuit 4 will automatically change the mode of the apparatus from the fast-forward mode or fast-rewind mode to the forward mode or reverse-forward mode if the AMS mode has been previously set by one of the switches $S_1$-$S_r$, or on the other hand, automatically changes the direction the tape runs if the forward reverse-forward mode has been previously set by one of the other switches.

The operation of the circuit shown in FIG. 3 will be clearly understood by comparing it with FIG. 4. When the mode of the apparatus is changed by one of the switches $S_1$-$S_r$, from the forward mode to the fast-forward or fast-rewind mode for setting the AMS mode at the time $T_1$ shown in FIG. 4, the control circuit 4 generates the prohibiting signal shown in FIG. 4(b), from its terminal F/R so that the output of the detecting circuit 1 is changed to the "L" level as shown by dotted lines in FIG. 4(a). On the other hand, the output of the playback amp 5 is supplied to the rectifying circuit 2a from time $T_1$, therefore the rectifying signal shown in FIG. 4(c) will be supplied through diode $D_2$ to the integration circuit 3. As shown in FIG. 4(d), the integration circuit 3, which is charged to a certain voltage level $et_1$, corresponding to the current coming from the detecting circuit 1 during the playback mode, will be charged to another voltage level $et_2$ corresponding to the current coming from diode $D_1$.

The rectifying signal disappears at time $T_2$ as shown in FIG. 4 item (c) when the non-recorded area is reproduced so that the output voltage $et_2$ of the integration circuit 3 is discharged along the curve $t_o$, and is determined by the time constant $(r_o \times C_o)$. If the non-recorded area is continuously detected for a certain time $t_o$ for example for 40 ms–100 ms in the fast-forward or fast-rewind mode which correspond to at least 1 sec in the forward mode which is used to distinguish the pianissimo part from the non-recorded area, the comparator CMP begins to operate from the time where the discharged curve $t_o$ crosses the referential voltage $E_r$.

Inverters $I_1$ and $I_2$, a delay circuit L, and AND circuit A are well known devices and detect the change from the "H" level to the "L" level so that the output pulse $P_1$ of the AND circuit A is supplied to the terminal IN as shown in FIGS. 4(f) (g) and (h), and the mode of apparatus is changed to the forward or reverse-forward mode.

As a result of this change, the prohibiting signal disappears at time $T_3$ as shown in FIG. 4(b), so that the output of the detecting circuit 1 recovers to its "H" level and the output of playback amp 5 is muted by the transistor 6. Whenever the AMS mode is set by one of the switches $S_1$-$S_r$, the above mentioned operations will be repeated.

When the end of coated portion is detected during the playback mode, the automatic reversing operation is performed as follows: In the playback mode of apparatus, the integration circuit 3 is charged to a certain level, $et_1$, by the current signal coming from the diode $D_1$ but when the leader portion at the end of the tape is detected by the optical device OD, the switching transistors $Q_1$ and $Q_2$ turn on so that the output of the detecting circuit 1 disappears at the time $T_4$ shown in FIG. 4(a). Therefore, the DC voltage of the integration circuit 3 is discharged along the curve $t_o$ which is determined by the time constant $(r_o - c_o)$. If the leader portion is continuously detected in the forward mode for a certain time $t_1$ which is less than the time $t_o$ (40 ms–100 ms) but long enough to distinguish an injured portion of tape from the leader portion, the comparator CMP begins to operate from the time when the discharging curve $t_o$ crosses the referential voltage $E_r$. Therefore, the output pulse $P_2$ is supplied to the terminal IN as shown in FIGS. 4(f) (g) and (h), and the running direction of tape changes to the other direction.

According to the embodiment described above, the integration circuit 3 is charged to a certain DC voltage by the incoming current in response to each mode, (AMS mode or Automatic reversing mode,) of the apparatus. Therefore, the times $t_o$ and $t_f$ can be set at different lengths for detection of each mode. Though this embodiment includes the logic circuit 2b for detecting the change of signal from the "H" level to the "L" level, it could be modified to the other type which would detect the change of signal from the "L" to the "H" level.

It will be clear that variations may be made by those working in this field, without departing from the novel scope of the present invention. It is my intent that the invention be limited only by the hereinafter recited claims.

I claim as my invention:

1. A tape reproducing apparatus of automatic reversing type comprising an optical sensor for detecting and producing different output signals from the magnetic coated portion of the tape and the leader of the tape, a first circuit connected to said sensor and generating a first output signal which changes from one state to another state only when the end of the coated portion of tape is detected by the sensor in a forward mode of apparatus, a circuit means including a rectifying circuit receiving a playback signal and detecting a non-recorded area in said tape, a second detecting circuit for generating a second output signal which changes from one state to another state only when a non-recorded area of the tape is detected in a fast-forward or fast-rewind mode of apparatus by said circuit means and an integration circuit which includes a capacitor and resistor which have a predetermined time constant, a switching circuit means responsive to the modes of the apparatus and selectively supplying one of said first or second output signals to said integration circuit such that the capacitor of said integration circuit is discharged and charged at the same time constant.

* * * * *